UNITED STATES PATENT OFFICE.

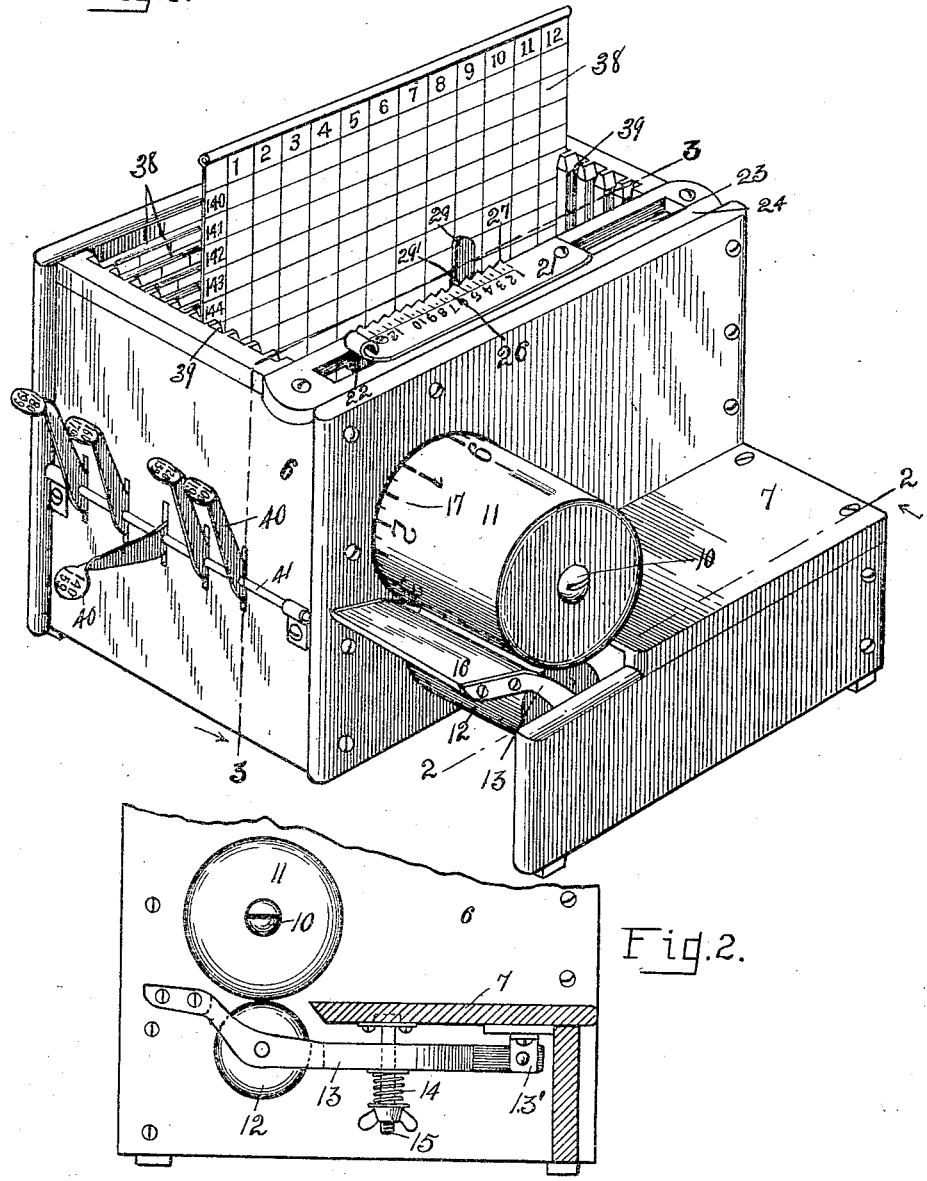

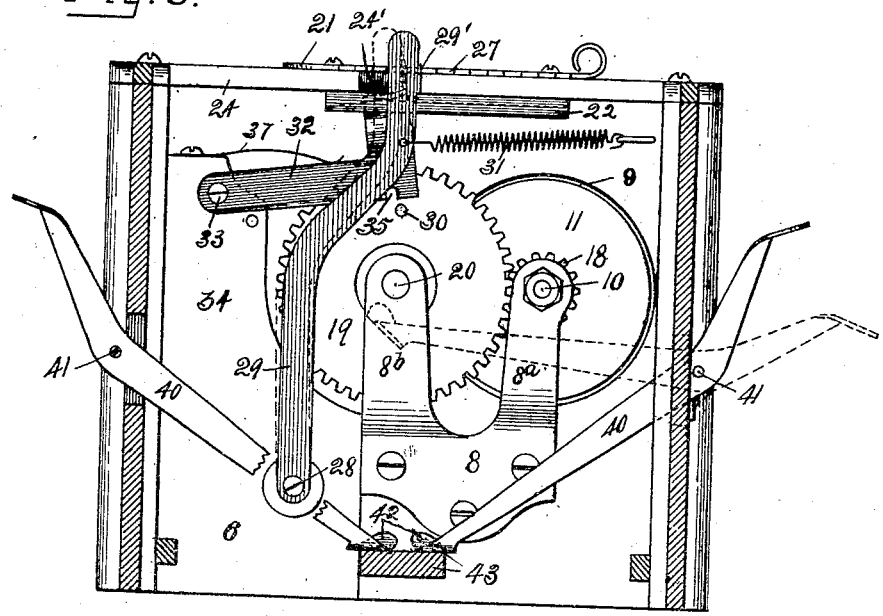

THEODORE M. WESTFALL, OF FOSTORIA, OHIO, ASSIGNOR OF ONE-THIRD TO DEWITT C. WESTFALL, OF FINDLAY, OHIO, AND ONE-THIRD TO ELMER E. WESTFALL, OF MOUNT PLEASANT, IOWA.

MEASURING INSTRUMENT.

No. 890,205.      Specification of Letters Patent.      Patented June 9, 1908.

Application filed June 24, 1907. Serial No. 380,456.

*To all whom it may concern:*

Be it known that I, THEODORE M. WESTFALL, a citizen of the United States, and a resident of Fostoria, in the county of Seneca and State of Ohio, have invented a certain new and useful Measuring Instrument; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to measuring instruments, and particularly to instruments for the measurement of cloth or other like goods which are customarily sold by the yard or other length designation.

The object of my invention is the provision of a simple, cheap and highly efficient device of the class described, which is operative to accurately measure the length of a strip of cloth or other like object drawn therethrough, and which may be set to measure a predetermined length of material, and automatically locks itself when the desired length has been measured.

The operation, construction and arrangement of the parts of the invention are fully described in the following specification, and illustrated in the accompanying drawings, in which,—

Figure 1 is a perspective view of an instrument embodying the features of my invention. Fig. 2 is a partial elevation thereof in section on the line 2 2 in Fig. 1. Fig. 3 is a vertical section taken on the line 3 3 in Fig. 1. Fig. 4 is a similar view with a portion of the parts shown in Fig. 3 removed, and Fig. 5 is a fragmentary section on the line 5 5 in Fig. 4.

Referring to the drawings, 6 designates a box or housing member from one side of which a convenient distance above its bottom projects a platform 7. Secured within the box to the side thereof from which the platform 7 projects, or in any other suitable manner is a bracket 8. Projecting outwardly from an arm 8ª of this bracket through an opening 9 in the box side is a shaft or spindle 10 on which a measuring drum or roll 11 is loosely mounted. This drum is disposed at one end of the platform 7 with its under side on a plane with its surface, and normally coacts with a lower yieldingly mounted pressure-roll 12, which has its trunnions journaled in the forked end of a lever 13. The opposite end of the lever 13 is fulcrumed to a bracket 13' secured to the under side of the platform 7, and an upward yielding pressure is imparted to the lever and roll 12 by a coiled compression-spring 14, which is carried by a bolt 15, said bolt being suspended from the underside of the platform, as shown in Fig. 2. The free end of the lever is provided in advance of the roll 12 with a plate 16 to which a downward pressure may be applied when it is desired to lower the pressure-roll from the measuring-drum 11.

While the drum 11 may be of any desired size, it is shown as being nine inches or one-quarter of a yard in circumference, and is provided, as at 17, with graduations to indicate the distance or fractional distances thereround.

Meshing with a small gear-wheel 18 fixed to the inner end of the drum 11, is a larger gear-wheel 19, which is mounted on a stub-shaft 20 carried by the arm 8ᵇ of the bracket 8, and in the present case is of proper proportion relative to the gear 18 to revolve once during four revolutions of the latter, or for each yard of linear movement of a point on the circumference of the drum 11.

21 designates an index-plate which is mounted for reciprocatory movement transversely of the drum 11 and carries a block 22 on its underside which works in a longitudinal slot 23 in a top-piece 24 of the box. This block is formed with lateral flanges or ribs to engage the bottom of the top-piece 24 to retain the plate 21 to its seat, as shown in Fig. 5, and has one of such flanges or ribs, preferably the one contiguous to the front of the box, partially cut away on its upper side to form a runway 25 between it and the top-piece 24, said runway being provided with an inclined nose 25'. The index-plate 21 has its surface graduated as at 26 to indicate a desired number of yards, or other length designation as the nature of the use of the apparatus may require, and has its inner side formed with a tooth 27 for each yard or other designation thereon, as shown.

Pivoted, as at 28, to a block or boss within the box 1 is a lever or oscillatory finger 29, which extends upwardly from said pivot and has its upper end formed with a lip 29' for engaging the teeth on the index-plate, the oscillatory movement thereof being limited by the length of a recess 24' in the side of the top-piece 24 in which recess the lever works. At each revolution of the gear-wheel 19 the lever 29 is rocked sufficiently by the contact therewith of a pin 30 carried by said gear for the lip 29' thereon to move to the right in Fig. 1 the distance of and engage the next tooth 27 in such direction in the series. After the lever has been rocked by the pin 30 a contraction-spring 31 actuates it to return to its normal or at rest position, thus causing the index-plate to be moved therewith the length of one tooth in the direction in which the numerals on the plate run.

In order to lock the mechanism against further movement when a predetermined length has been run off I provide an angled lock-finger 32, one arm of which is pivoted, as at 33, to a block 34 within the box and is provided on its underside, as at 35, with a notch for receiving the pin 30 when the finger is lowered for such purpose, while the other arm thereof extends upwardly from its free end of the finger and terminates in a lateral lip 36. This lip normally stands in the path of movement of the flange of the block 22 disposed toward the front of the box and is rounded or tapered as shown to adapt it to pass over the inclined nose 25' of the runway 25 formed by such flange when the index-plate and block are moved from their extreme right-hand position to the left, as shown in Fig. 4. It is thus apparent that as soon as the index-plate is moved from its extreme right-hand position shown in Fig. 4 the nose 25' of the runway 25 will pass under the lip 36 and cause the notch in the finger 32 to be raised free from the pin 30 to permit the gear 19 to revolve. A spring 37 presses against the top of the finger 32 to throw it to its seat on the pin 30 when released from the runway 25.

The box 1 is shown as being large enough to receive a series of price cards 38, the ends of which freely slide in grooves 39 in the ends of the box. For each card there is provided a lever-key 40, which is fulcrumed to a rod 41 at the side of the box through which it projects and has its inner end formed with a foot 42 on which its card loosely rests, thus causing a depression of the outer end of the key to effect a raising of the associated card, as shown in Figs. 1 and 3. The outer end of the key is shown as having two numbers designated thereon, one being for the first price of the series indicated on one side of the card and the other for the first price of the series indicated on the other side of the card. When the inner ends of the keys are lowered they rest on a beam 43 within the box. It is apparent that while it is convenient to employ the price cards 28 in connection with the measuring instrument, they may, if desired, be omitted and the box made only sufficiently large to incase the measuring parts disposed therein.

The operation of my invention is as follows:—The operator wishing to measure a number of yards of goods, for instance five yards, holds the lever 29 with its lip 29' out of engagement with the teeth 27 of the index-plate 21 and then moves said plate in position for the lip 29' to engage the fifth tooth thereon, as shown in Figs. 1 and 3. As the plate moves rearwardly or out of its normal at rest position the nose 25' of the runway 25 passes under the lip 36 of the lock-finger 32 and effects a raising of the finger free from the pin 30 on the gear 19 to permit said gear to revolve. The pressure-roll 12 is then lowered from contact with the drum 11 by a downward pressure on the plate 16 to permit the edge of the goods to be inserted between the two rolls 11 and 12. As the goods is drawn along between the two rolls, after the plate 16 has been released, the drum or roll 11 is caused to revolve and at the termination of each fourth revolution, which in the present case is equivalent to one yard, the gear 19 completes one revolution. As the gear 19 nears the end of each revolution the pin 30 carried thereby has contact with the lever 29 and moves it against the tension of the spring 31 in position for its lip 29' to engage, in the present case, the next tooth in the series toward the beginning of the graduation, or that designated "4". As the pin 30 passes on out of contact with the lever 29 the spring 31 draws the lever to its normal position and effects a movement of the index-plate the length of one tooth in the direction in which the index numerals run, such movement being completed approximately at the time the pin 30 reaches the point at which it started its revolution. This action is repeated for each yard, and as the measuring of the last yard or other length designated is completed the index-plate and its attached block 22 have moved in position for the lock-finger 32 to drop from the runway 25 of the block so that its notch 35 engages the pin 30 and prevents a further revolution of the mechanism until the index-plate is again moved to indicate a measurement to be made. To calculate the price of the goods sold the operator presses the key 40 having the proper range of price numerals thereon and thus effects an elevation of the desired card.

I wish it to be understood that I do not desire to be limited to the exact details of construction shown and described as obvious modifications will occur to a person skilled in the art, and that the unit of measurement employed, the arrangement of notches or teeth 27, and the relative dimensions of the measuring parts may be changed to suit the requirements of the particular case.

Having thus described my invention, what

I claim as new, and desire to secure by Letters Patent, is,—

1. In combination, a frame, a rotary member actuated by a movement of the goods to be measured, a movable index member, a revoluble element actuated by a movement of the rotary member, a lever fulcrumed to the frame and coacting directly with the index-member, said lever being movable by said element at each revolution thereof to effect an intermittent step-by-step movement of the index-member, substantially as described.

2. In combination, a frame, a measuring drum, a toothed index-member movable on the frame, a revoluble element actuated by a rotation of said drum, a lever coacting directly with the teeth of the index-member and movable by being intermittently struck by the revoluble member to effect an intermittent movement of the index-member to indicate successive measure units as the drum is rotated, substantially as described.

3. In combination, a frame, a rotary measuring-drum actuated by a movement of the goods to be measured, a revoluble member actuated by the drum, a toothed index-member carried by the frame, and a lever pivoted to the frame and having its free end in engagement with the toothed portion of the index-member and its intermediate portion disposed to be engaged and moved by the revoluble member at each revolution thereof whereby to effect a movement of the index-member, substantially as described.

4. In combination, a frame, a rotary measuring-drum, a revoluble member actuated by the drum, a toothed index-member having a ledge formed thereon, a lever pivoted to the frame and disposed to be acted on by the revoluble member at each revolution thereof to effect an oscillation of such lever and to act directly on the toothed portion of the index-member to move it a predetermined distance at each oscillation of the lever, and a finger pivoted to the frame and normally engaging the revoluble member to lock it against movement, said finger being adapted to be engaged and raised from locking engagement with the revoluble-member by the ledge on the index-member when the index-member is moved to indicate a measurement to be made, substantially as described.

5. In combination, a frame, a measuring-drum, a rotary member having movement communicated thereto from the drum, a pin fixedly projecting from said member, a lever fulcrumed to the frame and having intermittent oscillatory movements communicated thereto by the pin as it revolves, and an index-member movable by the oscillations of the lever to indicate the quantity of material measured.

6. In combination, a frame, a measuring-drum, a lever fulcrumed to the frame, a member revoluble by a movement of the drum to effect an intermittent oscillation of the lever, an index-member intermittently movable by the oscillations of the lever, and a pivoted finger automatically movable at a predetermined point in the movement of the index-member to engage the revoluble member and lock it against movement.

7. In combination, a frame, a measuring-drum, an element revoluble by a rotation of the drum, a finger normally engaging said element to lock it against movement, an index-member adapted to be moved to indicate the measurement required and on such movement to engage said finger and move it out of engagement with said element, said index-member being adapted to release the finger at a predetermined point in the return movement of the former to permit the finger to drop by gravity to reëngage the element, and a lever fulcrumed to the frame and intermittently movable by the element as it revolves to effect a step-by-step movement of the index-member to its normal position.

In testimony whereof I have hereunto signed my name to this specification in the presence of two subscribing witnesses.

THEODORE M. WESTFALL.

Witnesses:
C. W. OWEN,
HAZEL B. HIETT.